United States Patent [19]

Cammann et al.

[11] 4,259,562
[45] Mar. 31, 1981

[54] PORTABLE DISINTEGRATOR

[75] Inventors: Fred W. Cammann; Jere H. Roach, Rocky River, Ohio

[73] Assignee: Cammann Manufacturing Company, Inc., Cleveland, Ohio

[21] Appl. No.: 943,007

[22] Filed: Sep. 18, 1978

[51] Int. Cl.³ .............................................. B23P 1/00
[52] U.S. Cl. .................................. 219/68; 219/69 V; 219/70
[58] Field of Search .................... 219/68, 69 E, 69 M, 219/69 V, 69 G, 70; 200/61.47

[56] References Cited

U.S. PATENT DOCUMENTS

| | | | |
|---|---|---|---|
| 650,124 | 5/1900 | Coleman | 219/70 |
| 1,351,518 | 8/1920 | Jones | 219/68 |
| 2,415,690 | 2/1947 | Holfelder | 219/70 |
| 2,580,716 | 1/1952 | Balamuth | 219/69 V |
| 2,683,791 | 7/1954 | Ruelhlemann et al. | 219/69 V |
| 3,098,150 | 7/1963 | Inoue | 219/69 V |
| 3,144,541 | 8/1964 | Hill | 219/69 V |
| 3,415,970 | 12/1968 | Cline | 219/70 |
| 3,662,142 | 5/1972 | Olsson | 219/69 G |
| 3,775,580 | 11/1973 | Scherbaum | 219/69 E |
| 3,939,321 | 2/1976 | Bertrand et al. | 219/69 V |
| 4,043,033 | 8/1977 | Yeo | 200/61.47 |

Primary Examiner—C. C. Shaw
Attorney, Agent, or Firm—Pearne, Gordon, Sessions, McCoy & Granger

[57] ABSTRACT

A portable disintegrator to disintegrate a hole in a metal workpiece is disclosed. Disintegrator current and coolant are supplied to the working end of an electrode which is vibrated in advance and retract axial movements. Guide means either actually engages the workpiece immediately surrounding the hole to be formed or engages a part of the workpiece closely adjacent where the hole is to be formed in the workpiece. The main frame of the metal disintegrator may be counterbalanced for weight but is guided by hand with freedom of limited movement in two dimensions during operation of the disintegrator.

18 Claims, 12 Drawing Figures

PORTABLE DISINTEGRATOR

BACKGROUND OF THE INVENTION

Metal disintegrators are those which use an electric current to strike an arc between an electrode and a workpiece. A vibrator causes axial movement of the electrode and as the electrode retracts from the workpiece an arc is struck which dislodges a metal particle from the workpiece. As a hole is formed in the workpiece, feed means is provided to gradually move the electrode forward into the hole being formed. Coolant, usually water based coolant, is supplied to cool the electrode and carry away the chips being formed. Such metal disintegrators are used in salvage processes, for example, a partially formed workpiece may have a drill or tap broken off inside the workpiece. Rather than scrapping the workpiece a metal disintegrator is used to disintegrate the remaining portion of the drill or tap to salvage the workpiece.

An early proposal was to utilize an underwater electrical cutting electrode held to a metal workpiece by an electromagnet. Another early proposal was to remove a broken tap from a tapped hole in the workpiece wherein a special ring shaped support could be fastened to the workpiece and then an insulating guide on the ring support could provide axial guiding of a disintegrating electrode. In metal depositing rather than metal removing apparatus it has previously been proposed to vibrate an electrode in a portable unit. Also another proposal was a hand held unit wherein an electromagnet vibrated a disintegrating electrode. Still further, in electrical discharge machining of workpieces it is customary to provide a rigid but adjustable support for the electrode so that it may be guided and fed toward the workpiece. Such electrode supports were necessarily insulated from the workpiece for proper operation. Where the electrode is long, slender or otherwise transversely weak, it has been proposed to utilize an additional insulated guide near the working end of the electrode and supported from the machine structure.

The difficulty with the prior art constructions is that usually a large, heavy and rigid superstructure was required on the machine in order to rigidly but adjustably position the electrode properly for operating on a workpiece. Such adjustment mechanisms were often difficult to adjust easily and properly and to be sure that the workpiece was aligned with the aperture in the workpiece. Additionally, such distintegrators operated only with relatively movable workpieces which could be moved to the disintegrator machine. Where there were large or heavy workpieces and also where the workpieces were partially obstructed, such prior art disintegrators were unsuitable.

A special problem is how to remove defective rivets in a truck frame as the frame is being manufactured with the frame so large and unwieldy that it cannot conveniently be brought to a disintegrator machine. The problem is further complicated where the rivet to be removed is close to another frame member to be partially obstructed and in a location whereat the disintegrator electrode of a disintegrator machine cannot be aligned therewith. Accordingly the problem to be solved is how to construct a disintegrator which will operate on such large and partially obstructed workpieces.

SUMMARY OF THE INVENTION

This problem is solved by utilizing a metal disintegrator having a frame and guide means with an aperture in the guide means to receive and axially guide an electrode relative to a workpiece, means to supply disintegrator current and coolant to at least a working end of the electrode, vibrator means to vibrate the electrode in advance and retract axial movements, and insulator means between the workpiece and electrode, the improvement comprising, said guide means having a first portion for guiding the working end of the electrode and adapted to engage a first part of a workpiece closely adjacent the location of the workpiece contacted by axial movement of the electrode, and said frame being portable and having freedom of limited movement in two dimensions during operation of the disintegrator.

An object of the invention is to provide a metal disintegrator which is portable and which may be used in any attitude relative to the horizontal.

Another object of the invention is to provide a portable disintegrator which may be used to remove a rivet from a workpiece such as a large truck frame wherein access to such rivet is partially obstructed.

Another object of the invention is to provide a metal disintegrator wherein a part of the guide means for the electrode actually engages the workpiece for primary guiding thereby.

Another object of the invention is to provide a hand held or portable metal disintegrator which may be manually guided and moved slightly as it is in operation, yet such slight movement does not interfere with the proper operation of the disintegrator.

Other objects and a fuller understanding of the invention may be had by referring to the following description and claims, taken in conjunction with the accompanying drawing.

DESCRIPTION OF THE PREFERRED EMBODIMENTS

FIGS. 1-4 illustrate one preferred embodiment of a metal disintegrator 15 which includes generally a frame 16, guide means 17 on the frame to axially guide an electrode 18 and a vibrator means 19 to axially vibrate the electrode in advance and retract axial movements. The frame 16 includes side rails 21 and 22 and end plates 23 and 24 fixed thereto. The end plates may have handles 25 for gripping and moving the frame 16. Power means is provided to move the electrode 18, and shown as fluid motors 26 and 27 acting in parallel. These fluid motors are shown as cylinders having double ended piston rods 28 and 29 which are fixedly connected to the end plates 23 and 24. A sliding plate 30 is fixed to the cylinders 26 and 27 for longitudinal sliding movement on the piston rods 28 and 29. Side bars 32 and 33 are fixed to the sliding plate 30 and to another sliding plate 31 to which the vibrating means 19 is secured. Thus this assembly slides longitudinally as a unit on the piston rods 28, 29.

Figure 1:
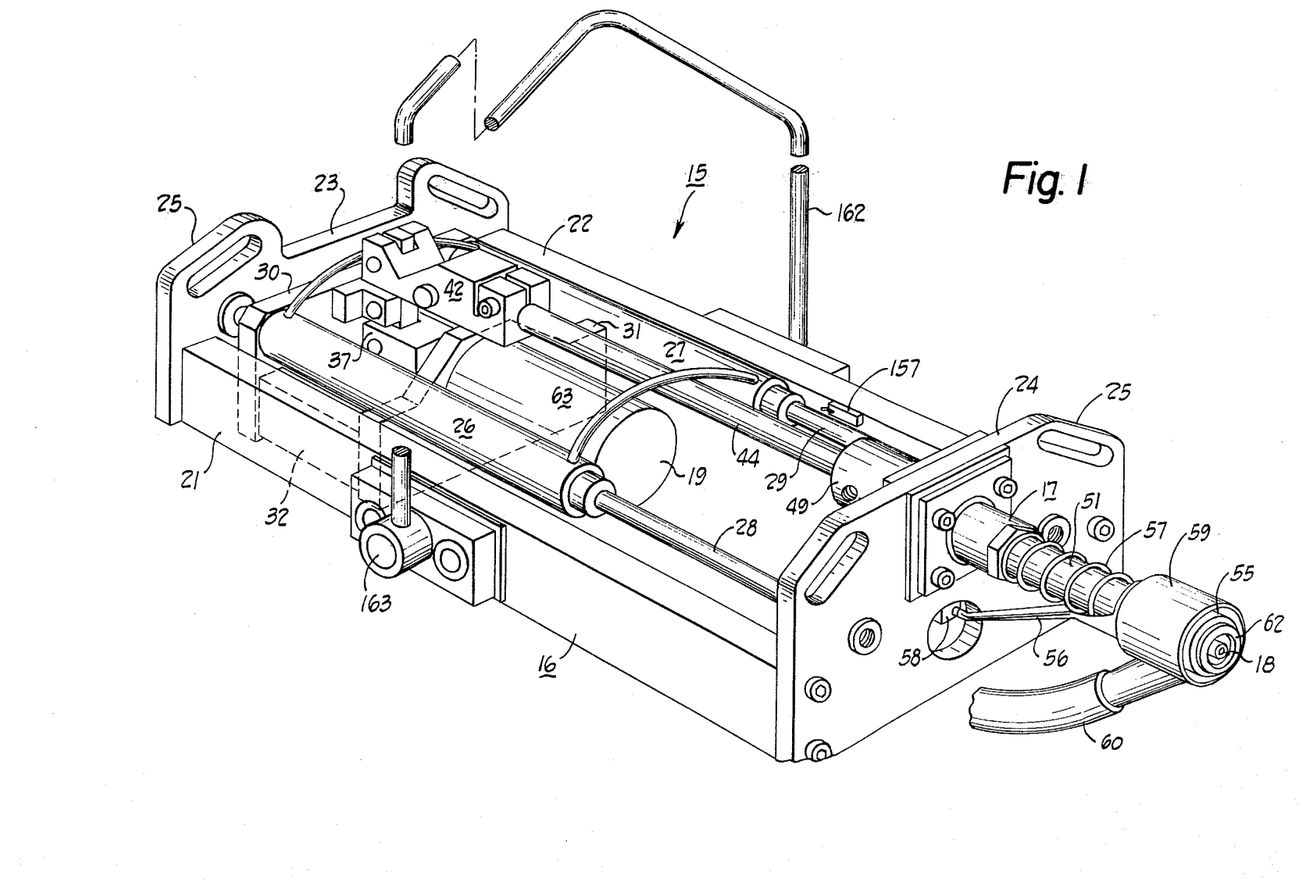
FIG. 1 is an isometric view of a metal disintegrator according to the invention.
Figure 2:
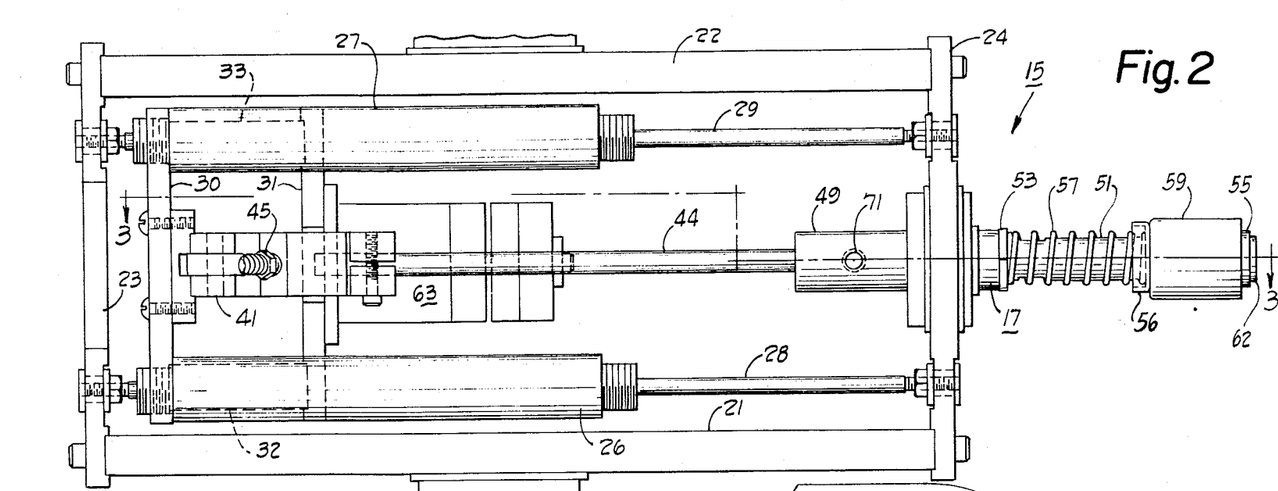
FIG. 2 is a plan view of the disintegrator of FIG. 1.
Figure 3:
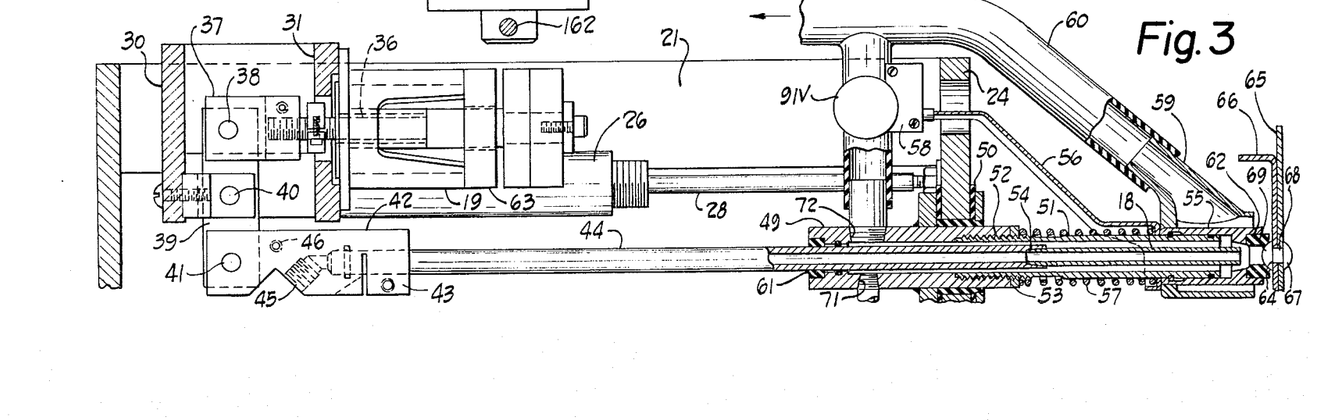
FIG. 3 is a vertical sectional view on the line 3—3 of FIG. 2.

The vibrating means 19 is a solenoid the frame of which is mounted on the sliding plate 31. This solenoid 19 has a vibrating armature 36 fixed to a yoke 37 which is pivoted at 38 to a lever 39. An intermediate point of the lever 39 is pivoted at 40 to the sliding plate 30 and the opposite end of the lever 39 is pivoted at 41 to a connector block 42. The connector block has a split chuck 43 for connection to an electrode shank 44. This electrode shank is disposed axially of the electrode 18 and is hollow for carrying fluid coolant.

The connector block 42 has a fluid connection 45 for supply of coolant to or from the electrode shank 44 and also has a power cable connection 46 for supply of electrode current.

The guide means 17 includes an insulated bushing 49 which may be of metal and mounted in an insulated manner by insulation 50 in the end plate 24. A guide tube extension 51 is threaded at 52 into the insulated bushing 49 and locked therein by a jam nut 53. The guide tube extension 51 is removable at the threads 52 for access to a tapered chuck 54 in the forward end of the electrode shank 44 for receiving replaceable electrodes 18. A guide tube plunger 55 is telescopingly received on the forward end of the guide tube extension 51 and held thereon by a lock ring. A switch plunger 56 encircles the guide tube extension 51 and is urged into engagement with the guide tube plunger 55 by a compression spring 57. The switch plunger 56 is shown in the unactuated position but when the guide plunger 55 is moved rearwardly, telescoping on the guide tube extension 51, the switch plunger 56 actuates a limit switch 58 which is mounted on the end plate 24.

The disintegrator 15 may be considered as having a sliding head 63 which includes the slidable parts of the disintegrator 15 slidable on the frame 16 and guided by the guide means. This head may include the vibrator 19, the cylinders 26 and 27, the electrode shank 44 and its connecting parts to the vibrator armature 36, and the guide tube extension 51 and guide tube plunger 55 and associated parts. A shroud 59 is carried on the guide tube plunger 55 and is connected to a suction hose 60. The guide means 17 further includes insulating guide bushings 61 and 62. The guide bushing 61 both centers the electrode shank 44 and also insulates it from the insulated bushing 49. The insulated guide bushing 62 performs four functions of centering the electrode 18, insulating it from the guide tube plunger 55, centering the end of the guide tube plunger on a part of the workpiece, and forms a coolant seal with the workpiece.

The workpiece is shown as a defective rivet 64 which is to be removed from a truck frame 65, for example, which has a closely adjacent frame member 66 which partially obstructs access to the rivet 64. This rivet workpiece 64 is shown with a preformed or manufactured head 67, a shank 68 and a riveted head 69 formed from material of the shank at the time of assembling the truck frame 65.

The insulated guide bushing 49 has coolant connections 71 and 72 either of which may be coolant in or out and these two connections lead to the space between the insulated guide bushing 49 and the electrode shank 44. The interior of the electrode 18 and electrode shank 44 are hollow in order to communicate with the fluid connection 45 in the connector block 42.

Insulation means is provided in the metal disintegrator 15 in order to insulate the electrode 18 from the workpiece 64. In this preferred embodiment the insulation means includes the insulation 50 for the insulated guide bushing 49, and also includes the insulated guide bushings 61 and 62.

Figure 4:
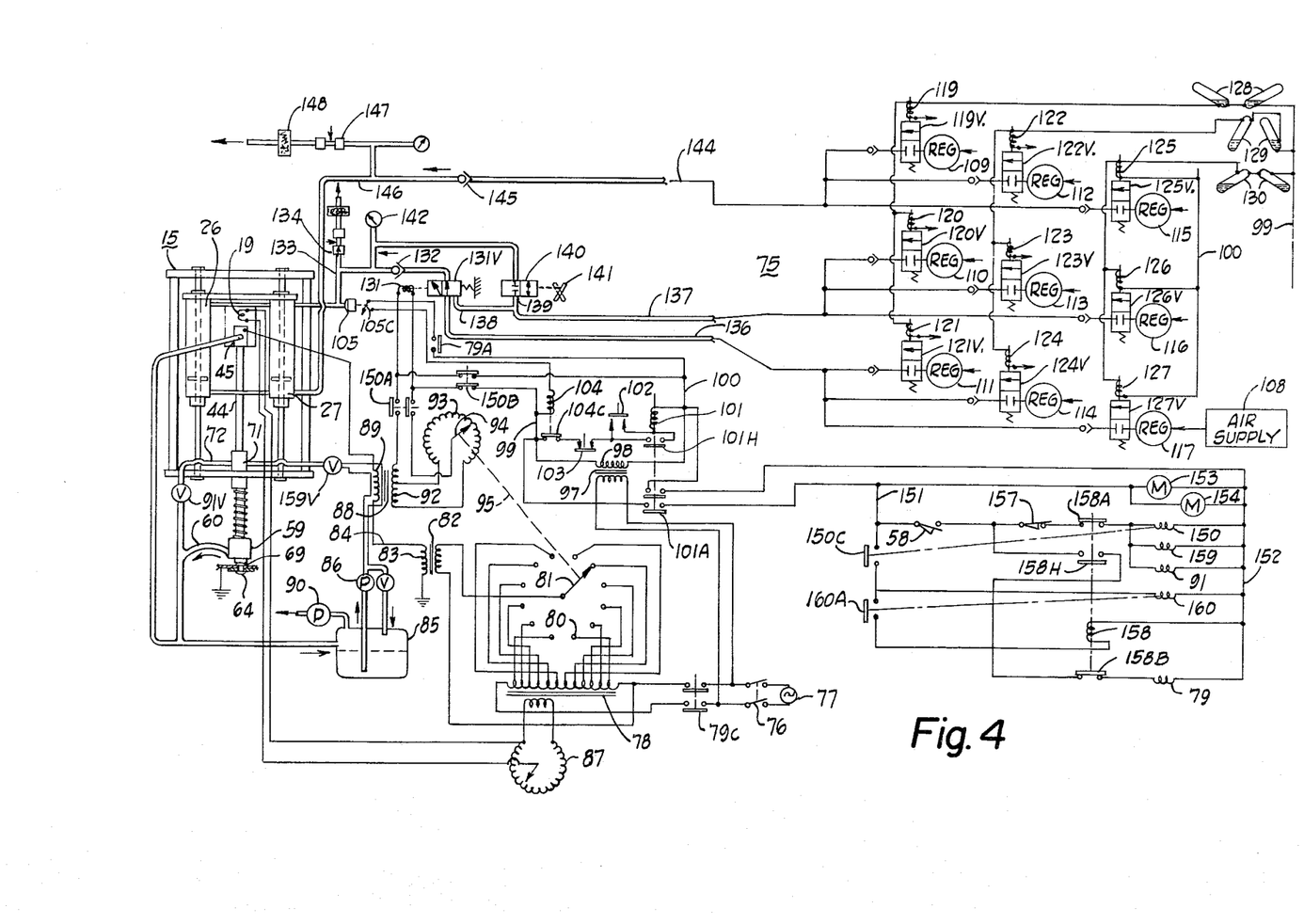
FIG. 4 is a schematic electrical and fluid diagram of the control circuit of the disintegrator.

FIG. 4 shows schematically a fluid and electrical control circuit 75 connected to control the metal disintegrator 15 which is shown schematically.

A suitable power source 77, such as single phase 60 hertz 220 or 440 volt, supplies an autotransformer 78 through a disconnect switch 76 and main contactors 79c. The autotransformer 78 is in a power circuit for arch current and has taps 80 thereon contactable by a tap switch 81 to connect a variable amount of voltage to a cutting transformer 82. This is a step down transformer to supply a low voltage from the secondary 83 through a conductor 84 to the electrode shank 44 and electrode 18.

The aqueous coolant is supplied by a pump 86 from a coolant tank 85 to the disintegrator 15. A sensing transformer 88 has a water cooled primary 89 and the coolant from coolant pump 86 cools this primary 89 and then passes to the coolant inlet 71. A suction pump 90 is connected to the tank 85 to form a suction on the coolant outlet 45 and through a valve 91V to the suction outlet 72 on the insulated bushing 49. The suction pump 90 is also connected to the suction hose 60 on the shroud 59 to suck air and any coolant leakage at the workpiece 64.

A variable transformer 87 is energized from transformer 78, and is connected to energize the vibrator 19. The sensing transformer 88 has a secondary 92 supplying a sensing voltage to a variable transformer 93. A variable voltage is obtainable from a moving arm 94 which may also be a tap switch on the taps of the sensing transformer secondary 92. This moving arm 94 may be individually movable or, as shown, may be ganged by a mechanical connection 95 to the tap switch 81 of the autotransformer 78.

A power source 77 also energizes a control transformer 97. A secondary 98 of this transformer energizes lines 99 and 100 and through a start switch 102 energizes a coil of relay 101 to close the contacts 101A to supply power to control lines 151 and 152. Also the contacts 101H are closed as holding contacts upon energization of the coil 101. A stop switch 103 will deenergize the relay coil 101. A timer relay 104 is also energized from the secondary 98 upon closing of pressure switch contacts 105C. When energized, the timer relay 104 opens normally closed timer contacts 104C, after a time delay, which contacts are in series with the relay coil 101.

The metal disintegrator 15 is provided with an electrode movement control to control movement of the electrode 18 in two directions: a first direction toward the workpiece 64 and a second direction away from the workpiece. This electrode movement control includes the fluid motors 26 and 27. The piston rods are fixed relative to the frame 16 and it is the cylinders of the motors which move to move the electrode 18. A fluid pressure supply is shown as an air supply source 108 which is connected to supply air under pressure to variable pressure regulators 109–117. Air supply 108 is shown connected only to regulator 117, but connects to all regulators. These pressure regulators are connected through solenoid actuated valves 119V–127V. These solenoid valves are actuated by solenoid coils 119–127, respectively.

Three pairs of mercury switches 128, 129 and 130 are mounted as a set on the disintegrator frame 16 for changing attitude therewith. These pairs of mercury switches are connected to energize the solenoids 119–127 through the lines 99 and 100. The lower end of each solenoid coil is connected to line 100, only some of these connections being shown for simplicity. The solenoid valves 121V, 124V and 127V are connected to a conduit 136 through a solenoid actuated selector valve 131V, a check valve 132 and a conduit 133 to the upper end of the cylinders 26 and 27. A variable restriction air bleed 134 and an air filter are also connected to this end of the cylinders. The second group of solenoid valves 120V, 123V and 126V are connected to a conduit 137 which leads to an input 138 of the selector valve 131V and also leads to input 139 of a manual valve 140. A handle 141 may actuate the manual valve 140 between up and down positions. The outlet of the manual valve 140 connects to the conduit 133. The pressure actuated switch 105 is connected to this conduit 133 and also a pressure gauge 142 may be connected to this conduit 133.

The third group of solenoid valves 119V, 122V and 125V are connected to a conduit 144 and then through a check valve 145 to a conduit 146 which leads to the lower end of the cylinders 26 and 27. Also connected to this conduit 146 is a variable air bleed 147 and a filter 148. The solenoid coil 131 is connected to the variable transformer 93 through normally open relay contacts 150A and is also connected through normally closed contacts 150B to the lines 99 and 100. These lines are connected through relay contacts 101A to lines 151 and 152, across which may be energized motors for the pumps and other valves and relays. Motors 153 and 154 to drive the coolant pump 86 and the suction pump 90, respectively, are connected across the lines 151 and 152. The relay coil 150 is connected across these lines through the start limit switch 58, a depth stop switch 157 and a cutting time relay contact 158A. Also in parallel with the relay coil 150 is the relay coil 159 for the coolant valve 159V and a relay 91 to actuate the valve 91V. A timer relay 160 is connected across lines 151 and 152 through normally open contacts 150C of the relay 150. A coil 158 of a cutting time relay is connected across the lines 151 and 152 through normally open contacts 160A and the contacts 150C. It is also connected across these same lines through the start switch 58 and holding contacts 158H of the timer relay 158. In parallel with the relay coil 158 is the series combination of the relay contacts 158B and a relay coil 79 to actuate contacts 79C which control power to the electrode 18 and to start vibration. The depth stop limit switch 157 is shown in FIG. 1 as being mounted on the frame 16 to be actuated by movement of the cylinder 27. This actuation may be relatively adjusted longitudinally for an adjustable cutting depth. Some details of the control circuit 75 are set forth in the U.S. Pat. No. 3,833,785 which discloses an earlier control circuit used with an arc disintegrator which was not a portable unit, rather it was mounted on a rigid but adjustable frame.

OPERATION

The metal disintegrator 15 may be used to disnitegrate an aperture into a metallic workpiece by action of an arc struck between the electrode 18 and the workpiece 64 by action of the vibrator 19. The electrode 18 engages the workpiece 64, the vibrator 19 retracts the electrode and an arc is struck to separate particles from the workpiece which are carried away by the coolant, either gaseous or liquid coolant. In the preferred embodiment an aqueous coolant is utilized. The flow of such coolant is reversed relative to that in the usual disintegrators with the flow being into the space around the electrode 18, and then upwardly through the interior of the hollow electrode 18. This coolant serves the dual purpose of cooling the electrode 18 and carrying away the disintegrated particles.

In the example shown, disintegrator 15 may be used as a deriveter to disintegrate an aperture into the head 69 of the rivet and thus remove the rivet from the truck frame 65. If the rivet is one which is defective in the sense that a washer shaped projection is formed between the two parts of the truck frame, then the electrode may disintegrate an aperture completely into the shank 68 of the rivet in order to remove not only the head 69 but also this extra unwanted washer shaped projection.

The electrode 18 is guided by the guide means 17 which includes the insulators 61 and 62. The insulator 62, engaging the rivet head 69 centers the electrode on this rivet head 69 to accurately guide the electrode in its disintegrating action. In one actual disintegrator constructed in accordance with the invention, this disintegrator was about 27 inches long and weighed approximately 40 pounds. Accordingly, it may be hand held although in that embodiment a bale 162 was provided, pivoted at 163 to the frame 16. This bale permitted swivelling of the entire disintegrator 15 in various attitudes including vertically downward, horizontal and inverted with the electrode pointing upwardly. The bale may be attached to a cable, for example, and then to a counterweight to support the majority of the weight of the disintegrator 15. The disintegrator thus becomes hand guided and portable. Even if the left end of the disintegrator frame 16 were to wobble or move one quarter inch, for example, during cutting, since the electrode 18 cuts only perhaps three-fourths inch deep, this would cause transverse movement of the tip of the electrode 18 only about six to ten thousandths of an inch. This normally would not cause undue short circuiting of the electrode tip since it would erode away the side walls of the cavity the small amount needed.

The purpose of the control circuit 75 is to permit the portable disintegrator to have three functions: 1. to allow the disintegrator 15 to start operating as soon as the guide tube 55 is pressed against the workpiece, 2. to collect the coolant at the point of use, an 3. to select the predetermined air pressures suitable for proper operation in any of the attitudes of the electrode 18 in relation to the direction of gravity.

The three pairs of gravity actuated switches 128–130 are typical of switches which may be used for different attitudes. In the embodiment shown these control vertical, horizontal and inverted positions of the disintegrator 15. It may be seen that the angle between a pair of switches determines the angular range of movement in which the contact will be maintained. For example, the axes of the switches 128 are about 150° apart, and subtracting this from 180°, the angular range is 30° during which electrical contact is maintained. This would be about 15° on each side of vertical with the electrode 18 pointing downwardly. The pair of switches 129 will control the disintegrator for horizontal attitudes and the pair of switches 130 will control the disintegrator 15 for an inverted position with the electrode 18 pointed upwardly. The regulators 109–117 will have been adjusted for the correct air pressure to balance the unbalanced weight of the head 63 in the respective attitudes. The angle between a pair of switches may be adjustable to adjust the angular range through which that pair has control of the disintegrator. Also each of the three pairs may be adjustable on the frame 16 and interlocked so as to prevent overlap of ranges, so as to permit operation of the disintegrator in any attitude.

If the disintegrator 15 is wobbling in the horizontal position, then gravity does not tend to make the head 63 move. The switch pair 129 will cause the solenoid valves 122V, 123V and 124V to be operable, and the associated pressure regulators 112, 113 and 114 may be set at about 4, 20 and 2 psi, respectively for a 20 pound head weight. If the disintegrator 15 is inverted to work vertically upwardly on a workpiece, then the switch pair 130 will cause the solenoid valves 125V, 126V and 127V to be operable. The associated pressure regulators 115, 116 and 117 may then be set at about 24, 20 and 2 psi, respectively, with the regulator 115 being used to compensate for the weight of the head 63 in the inverted position.

If the disintegrator is in the vertical position, then the retract regulator 110 might be set at 40 psi, the feed regulator 111 set at 22 psi and the compensation regulator 109 set at 2 psi. Thus the head 63 would have relatively free and balanced movement up and down when the disintegrator 15 is in the vertical position with the regulator 110 supplying a high pressure ready to quickly retract the head under certain conditions, for example, should the electrode 18 short circuit and tend to weld itself to the workpiece 64.

When the disconnect switch 76 is closed, the control transformer 97 is energized and through the lines 99 and 100 the selected pair of mercury switches, in this case switches 128, pass current to the solenoid valves 119, 120 and 121 to actuate these valves. Also the normally closed contacts 150B supply power to the solenoid valve 131 causing the head 63 and electrode 18 to retract. When the operator is ready to start he will press the start button 102 which will start the pump motor 153 and the suction motor 154 to drive pumps 86 and 90.

Pressing the guide tube plunger 55 against the workpiece 64 closes the limit switch 58 which causes a sequence of events to place the disintegrator 15 into operation. First, the normally closed coolant valve 159V is opened so that coolant flows around and through the electrode, out the fluid connection 45 and back to the tank 85. Second, the normally open suction valve 91V will close to keep water around the electrode causing it to flow upwardly through the inside of the electrode 18 and out of the fluid connection 45. Third, the control relay 150 will be actuated so that the contacts 150A are closed and the contacts 150B are opened. This transfers the control of the solenoid valve 131V from the control circuit 75 to the transformer 88 and hence the head 63 is placed in the run/retract mode. Fourth, the contacts 150C close actuating the timer relay 160. Fifth, the relay contacts 160A close after a time delay period, e.g. two seconds, which gives time for the coolant water to be present around the electrode. Sixth, the cutting time relay 158 is activated. This timer is a cutting time timer that will shut off the head 63 after a selected time, by controlling the relay 79 and the relay 150. Seventh, the holding contact 158H for the relay 158 will prevent the cycle from repeating if the head and electrode 18 are not lifted off the workpiece, to open the limit switch 59, when the cutting time timer relay 158 stops the cut. Eighth, relay 79 is activated and this energizes the transformer 78 through contacts 79C so that the large amperage current is fed to the electrode 18 and the vibrator means 19 is energized for vibration and cutting power. Ninth, if the depth stop limit switch 157 is reached and the switch opened before the relay 158 times out, the cut will stop. This reverses the valves 91V and 159V. Tenth, the normally open contacts 79A prevent the retract pressure from pressure regulator 110 acting on pressure switch 105 from operating the time delay relay 104 when contacts 150B are closed during the non-use retract mode, which, if actuated, would shut down the controls at the relay 101 after the time delay, of about three seconds.

The cycle can be stopped in any one of five ways. The first is moving the head 63 and electrode 18 axially away from the cutting point which will open the limit switch 58 to deenergize relays 150, 158 and 79. This stops cutting power and vibration and puts the head 63 into the retract mode by opening contacts 150A and closing contacts 150B. A second way is to press the stop button 103 which deenergizes relay 101 and by opening contact 101A this deenergizes lines 151 and 152. A third way is to actuate the depth stop limit switch 157 at the end of the cutting stroke. A fourth way is to have the cutting time timer relay 158 time out even though the limit switch 58 is still closed. A fifth way is upon overcurrent acting for more than the three second delay of timer 104 will open contacts 104C.

Figures 5, 6:
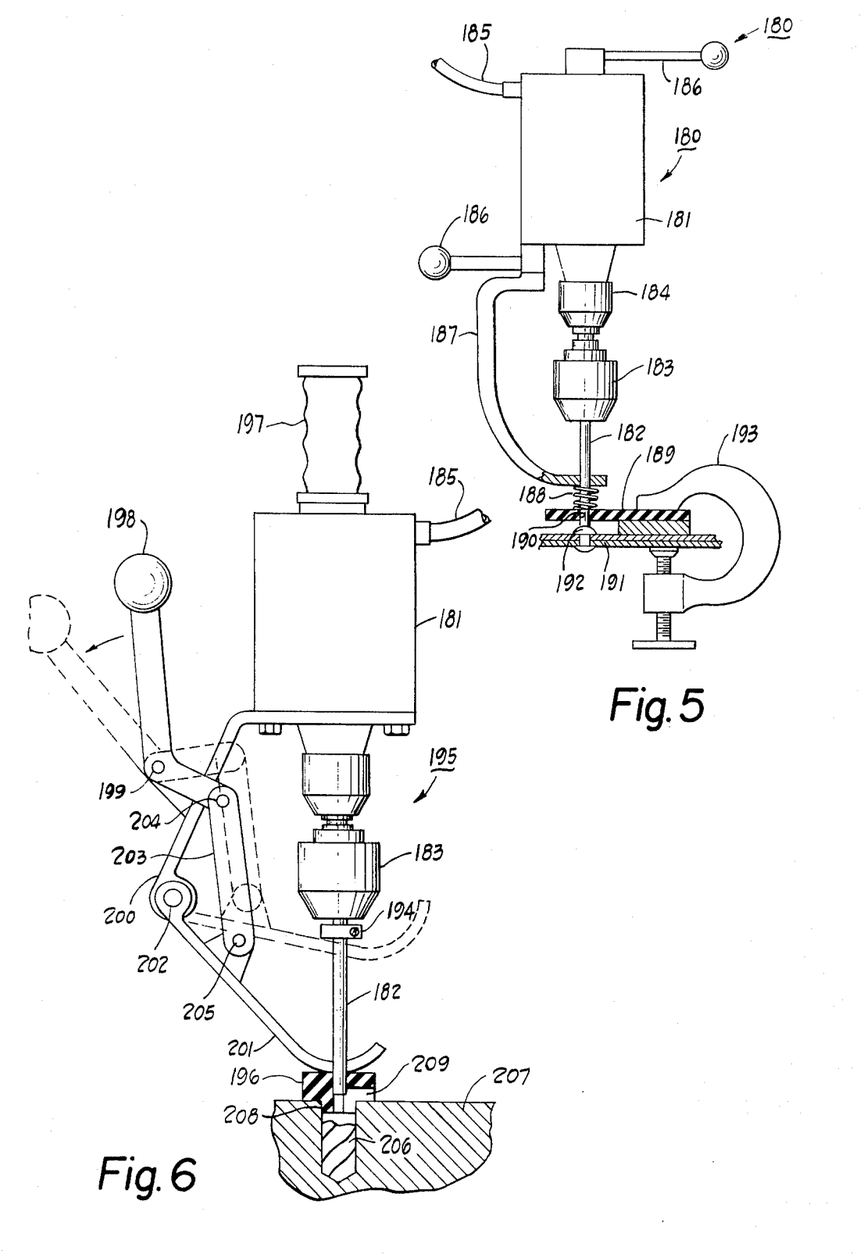
FIGS. 5-7 are elevational views of different embodiments.

FIG. 5 shows a modification of a metal disintegrator 180 which includes a head 181 which contains vibrating means to axially vibrate an electrode 182 held in a chuck 183. An adjustable nut 184 may adjust the gap of the vibrating means. Electrical power and coolant may be supplied through a cable 185 connected to the head 181. Handles 186 may be used to guide the disintegrator 180. The head 181 may be considered the frame of the unit which is supported by a support arm 187 and a compression spring 188 which rests on an insulating guide bushing 189 having an aperture 190 to axially guide the electrode 182. The insulating guide bushing 189 may be clamped at 193 to a workpiece such as the truck frame 191 having a rivet head 192 as the actual part of the workpiece to be disintegrated.

This disintegrator 180 offers the advantage of simplicity over the disintegrator 15 of FIGS. 1–4. A control circuit such as control circuit 75 may be used with the disintegrator 180 although it may be simplified by the elimination of the limit switch 58 and depth stop switch 157, and controlled manually in the start and stop modes.

In operation, the vibrator means in the head 181 will vibrate the electrode 182 axially and the feed forward toward the workpiece 192 will be manually supplied by the operator, against the urging of the spring 188. Again, because of the close distance between the insulator guide bushing 189 and the workpiece 192, slight lateral movements of the head 181 will have only minor effect on the lateral positioning of the tip of the electrode, and in practice apertures of a depth of 0.75 inches may be accomplished, guiding the disintegrator 180 by hand.

FIG. 6 illustrates another embodiment of a metal disintegrator 195 which may have the head 181, chuck 183 and electrode 182, as shown in FIG. 5, plus an insulated guide bushing 196. A handle 197 may be used to guide the disintegrator 195 and a feed handle 198 is provided which is pivoted at 199 on a support arm 200. An adjustable support art 201 is pivoted at 202 to the support arm 200. A link 203 is pivoted at 204 to the lever 198 and pivoted at 205 to the adjustable support 201. The workpiece is shown as a broken tool 206 in a machined part 207.

A depth stop 194 may be secured by a set screw at any desired position along electrode 182. The guide bushing 196 has male-female engagement with the workpiece 207, shown as a male projection 208 on the bushing engaging the workpiece aperture which contains the broken drill 206. Coolant and chip escape apertures 209 may be provided in the bushing 196.

In operation, the control circuit may be similar to the control circuit 75 of FIGS. 1-4, but simplified by omitting the start switch and depth stop switch. As the feed handle 198 is lowered toward the workpiece 206, the electrode 182 will be lowered into the workpiece 206 to disintegrate an aperture thereinto. Again, the insulating guide bushing 189, close to the workpiece, will adequately guide the electrode 182 despite limited movements in two dimensions of the handle 197.

Figure 7:
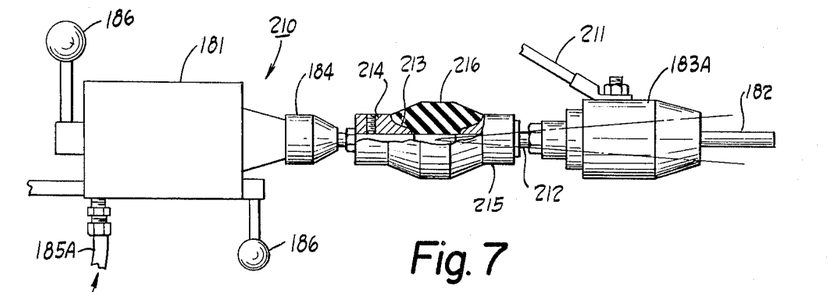

FIG. 7 illustrates another metal disintegrator 210 having the vibrating head 181 and the gap adjusting nut 184 as well as the handles 186 of FIG. 5 together with a conduit 185A to supply coolant to the electrode 182. This electrode is held by the chuck 183A to which the power cable 211 is connected. The chuck 183A has a shank 212 which is connected to the gap nut 184 by a universal joint 213. This may be the usual type of universal joint of two yokes interconnected by a pivoting cross, or, as shown, may be a shear type of flexible coupling which includes first and second hollow end portions 214, 215 with a rubber sleeve 216 bonded to each end portion. This integral flexible coupling permits deviation of the electrode axis by 15° relative to the axis of the head 181. Such universal joint 213 will transmit the axial vibration from the head 181 and transmit the coolant. More than one such universal joint may be included between the head 181 and the electrode 182, should more variability in axis position or offset of the electrode axis and head axis be desired.

Figure 8:
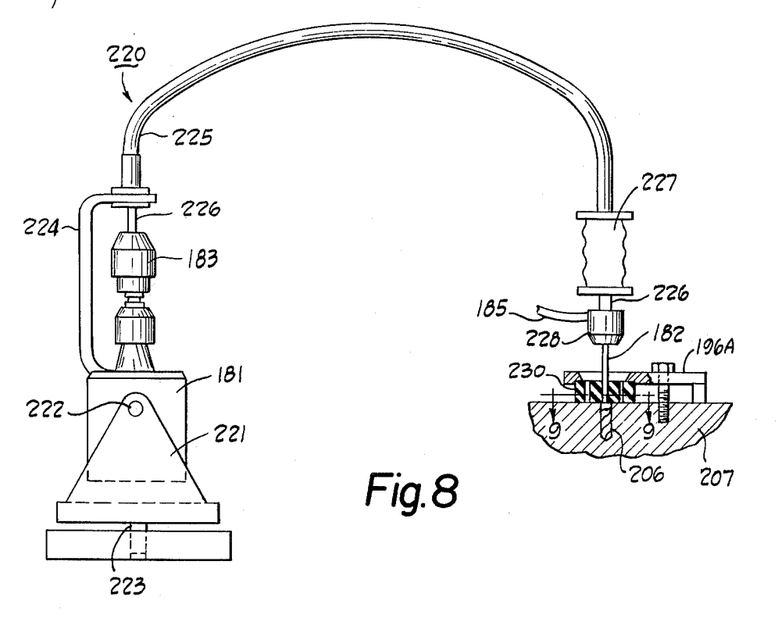
FIG. 8 is an elevational view of a further embodiment.

FIG. 8 illustrates a further disintegrator 220 which has the head 181 supported on a gimbal 221 for swiveling motions about two axes 222 and 223 which are mutually perpendicular. A support 224 fixed to the head 181 supports the outer sheath 225 containing an inner flexible push-pull cable 226. The frame of this disintegrator includes the flexible cable outer sheath 225. This cable is attached to the chuck 183 which is axially vibrated by the head 181. A hand grip 227 is connected to the other end of the sheath 225 and the remote end of the inner cable 226 is connected to a chuck 228. This chuck has provisions for electrical power and coolant such as from the cable 185. The chuck holds the electrode 182 which acts on a workpiece such as a broken tool 206 in a workpiece 207. The electrode 182 is guided by guide means which includes an insulating guide bushing 230 clamped in a suitable manner to the workpiece 207, for example, by the clamp 196A. In FIG. 7, if the rubber sleeve 216 is not hollow, coolant may be fed to the chuck 183A as in FIG. 8.

Figure 9:
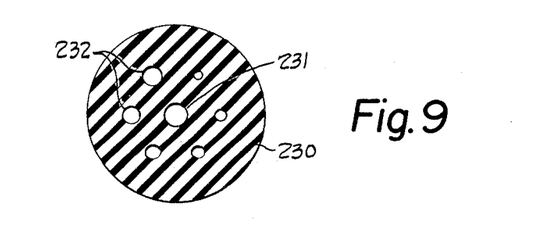
FIG. 9 is a sectional view on line 9—9 of FIG. 8.

FIG. 9 illustrates this insulating guide bushing 230 which may be a generally cylindrical shaped member of insulation having a central aperture 231 and a group of peripherally disposed apertures 232 of different sizes. By rotating this member 230 for selecting the proper size aperture in accordance with the diameter of the electrode 182, this insulating guide bushing 230 may be usable with a wide variety of electrodes and workpieces.

Figure 10:
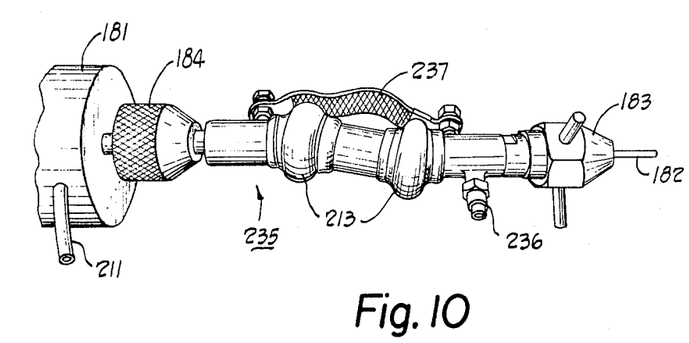
FIGS. 10 and 11 are perspective views of further embodiments.

FIG. 10 illustrates a further metal disintegrator 235 wherein the chuck 183 holds the electrode 182. Two universal joints 213 are provided and these may be similar to those shown in FIG. 7. A coolant connection 236 is provided to the chuck 183. The left end of the universal joint 213 is carried by the head 181 with electrical power supplied by the power cable 211 to the head and carried around the two universal joints by a flexible cable 237. The electrode 182 may be used with any of the guide means of the previously mentioned figures and the two universal joints permit offsetting the axis of the electrode relative to the axis of the head 181 so that work close to an obstruction may be performed.

Figure 11:
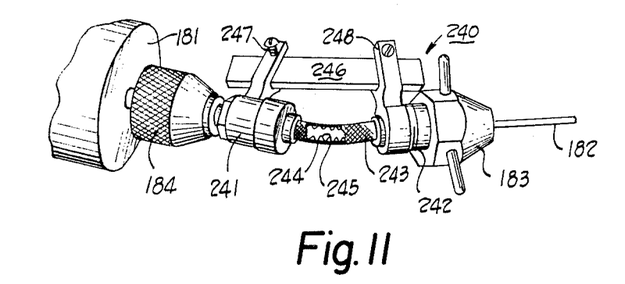

FIG. 11 shows another metal disintegrator 240 which includes the head 181 and the gap adjusting nut 184 holding a first portion 241 of a flexible connector 243. The second portion 242 of this connector 243 is connected to the chuck 183. This flexible connector 243 has an outer metallic braid 244 and an inner bellows 245 to both transmit the coolant and to transmit the electrical power along with the outer metal braid 244. An adjustable support bar 246 is clamped by clamps 247 and 248 to the portions 241 and 242 of the flexible connector 243. This support bar 246 provides additional angular control and rigidity, which is especially useful where the electrode 182 is desired to be maintained at some adjustable angle relative to the axis of the head 181. Again the electrode 182 may be used with any of the insulating guide means illustrated in the preceding figures. The depth stop 194 of FIG. 6 may be used, if desired, with any of the modifications of FIGS. 7, 8, 10 or 11.

Figure 12:
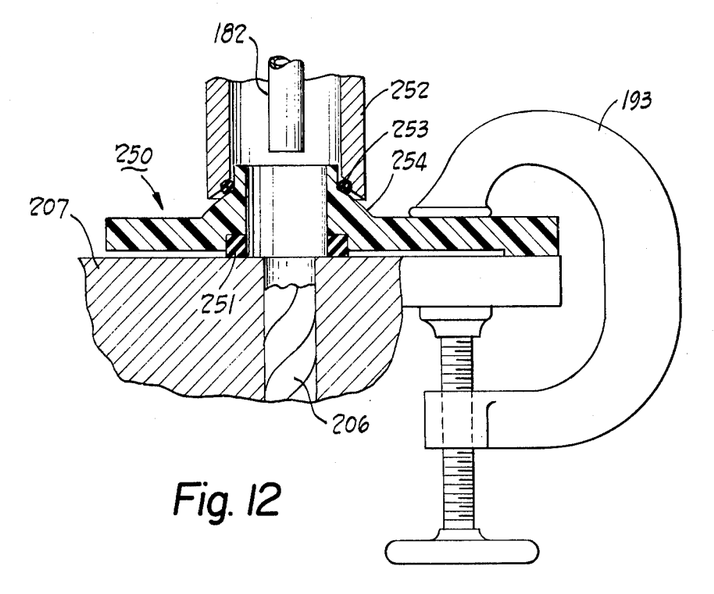
FIG. 12 is a vertical sectional view of a still further embodiment.

FIG. 12 illustrates an insulating guide means 250 which is especially useful with the metal disintegrator 15 of FIGS. 1-4. This guide means 250 may be clamped in a number of ways such as by the clamp 196 of FIG. 6 or as shown, by the clamp 193. The guide means 250 is of insulation material and has an annular seal 251 acting between this guide and a workpiece such as workpiece 207 containing a broken tool 206. The electrode 182 is shown in a retracted position similar to the position shown in FIGS. 1 and 3. A guide tube 252 similar to the guide tube plunger 55, may be of metal and is shown as surrounding coaxially the electrode 182. An O-ring 253 may be used to seal this guide tube 252 to an annular shoulder 254 on the guide means 250. By this means of the O-ring 253 and annular seal 251, the coolant may be retained inside the guide tube 252, and circulated as in FIGS. 1-4.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A metal disintegrator having a frame supporting a guide means with an aperture in the guide means to receive and axially guide an electrode relative to a workpiece, means to supply disintegrator current and coolant to at least a working end of the electrode, vibrator means to vibrate the electrode in advance and retract axial movements, and insulator means between the workpiece and electrode, the improvement comprising, said guide means having a first portion for guiding the working end of the electrode and adapted to engage a first part of a workpiece closely adjacent the location of the workpiece contacted by axial movement of the electrode, said frame being portable and having freedom of limited movement in two dimensions during operation of the disintegrator, and annular coolant seal means in said guide means carried on said frame to have limited movement therewith, said coolant seal means having a curved surface cooperable with the workpiece and conformable thereto to inhibit coolant leakage therebetween despite slight movements in two dimensions of the disintegrator.

2. A metal disintegrator as set forth in claim 1, wherein said electrode is hollow, and means to direct coolant through the hollow electrode.

3. A metal disintegrator as set forth in claim 1, wherein said guide means first portion surrounds a majority of said working end of the electrode.

4. A metal disintegrator as set forth in claim 1 wherein said annular seal means is in said guide means first portion and adapted to engage the workpiece to contain the coolant within said guide means.

5. A metal disintegrator as set forth in claim 4, wherein said electrode is hollow, said coolant supply being to the external surface of said electrode, and a coolant exit communicating with the interior of said hollow electrode.

6. A metal disintegrator as set forth in claim 5, including suction means connected to said coolant exit to aid in extraction of coolant through the interior of said hollow electrode.

7. A metal disintegrator as set forth in claim 1, wherein said insulator means includes an insulator as part of said guide means first portion, and an aperture in said insulator to receive and closely guide the electrode.

8. A metal disintegrator as set forth in claim 1, wherein said first portion of said guide means includes said annular seal means and is concave to engage and be centered on a convex portion of the workpiece.

9. A metal disintegrator as set forth in claim 1, wherein said annular seal means has a partially spherical end adapted to engage the workpiece.

10. A metal disintegrator as set forth in claim 1, wherein said guide means is tubular to enclose the electrode and coolant.

11. A metal disintegrator as set forth in claim 1, wherein said guide means includes an electrode shank connected to said vibrator means, a chuck adapted to hold said electrode and connected to said electrode shank, said guide means being tubular, and said guide means first portion being removable from a second portion of said guide means for access to said chuck.

12. A metal disintegrator as set forth in claim 1, wherein said guide means first portion is axially slidable on a second portion of said guide means, and electrical switch means actuated by telescoping movement of said guide means first portion in contacting a workpiece and connected to energize the metal disintegrator.

13. A metal disintegrator as set forth in claim 1, including a suction means connected to said guide means to aid in extraction of coolant from said guide means.

14. A metal disintegrator as set forth in claim 1, including a shroud surrounding said annular seal means adjacent the workpiece, and suction means connected to said shroud to extract coolant therefrom.

15. A metal disintegrator as set forth in claim 1, including power means to move the electrode axially relative to said portable frame.

16. A metal disintegrator as set forth in claim 15, including attitude control means connected to control said power means in accordance with the attitude of said portable frame.

17. A metal disintegrator as set forth in claim 15, including attitude means mounted on said portable frame, and means connecting said attitude control means to said power means to control said power means differently for each of horizontal, vertical and inverted attitudes of said portable frame.

18. A metal disintegrator as set forth in claim 1, wherein said first portion of said guide means includes a male-female engagement with the workpiece.

* * * * *